April 26, 1927.                A. EKMAN                1,625,801
                               PACKING
                          Filed Nov. 14, 1921
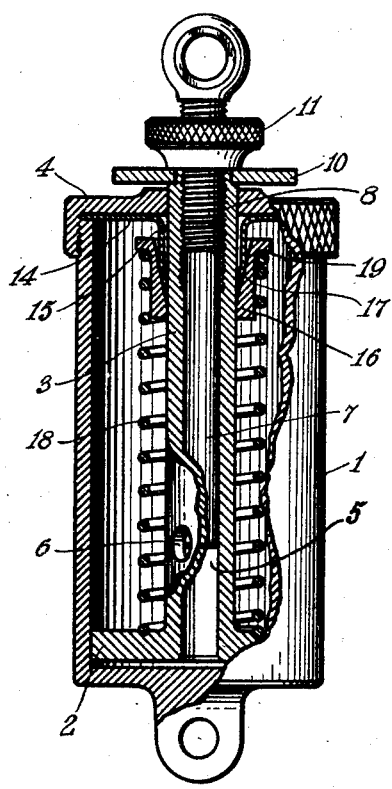
Inventor
Andrew Ekman
Kenyon & Kenyon
Attorneys Patented Apr. 26, 1927.

1,625,801

UNITED STATES PATENT OFFICE.

ANDREW EKMAN, OF GRAND RAPIDS, MICHIGAN, ASSIGNOR, BY MESNE ASSIGNMENTS, TO BLEICK SYNDICATE, COMPOSED OF WILLIAM D. BLEICK AND D. H. CONNOR, BOTH OF NEWARK, NEW JERSEY, AND F. J. PARKER AND J. J. HARRIS, BOTH OF MONTCLAIR, NEW JERSEY.

PACKING.

Application filed November 14, 1921. Serial No. 514,884.

My invention relates to an improved packing device adapted particularly, but not exclusively, for dash pots for use in adding machines and like mechanisms and through which fluid, such as oil, is forced from one side of a piston to the other by the relative movement between the piston and the coacting pot or casing. The principal object of the invention is to obviate objectionable leakage from the dash pot of the oil or other retarding liquid.

In order that my invention may be better understood, attention is directed to the accompanying drawing forming a part of this specification and illustrating a dash pot containing one embodiment of my invention.

In the drawing the figure is a view of the dash pot partly in longitudinal cross section and partly in elevation.

Referring to the drawing, the cylindrical pot or casing 1 has mounted therein the piston 2 which is formed with a piston rod 3 extending through the cap 4 which provides one end wall of the casing. In order to permit the oil in the casing to pass from one side of the piston to the other upon the relative movement between the piston and the casing, there is provided a passage 5 passing axially through the piston rod and piston and a port or opening 6 extending transversely through the piston rod into the passage 5. The flow of retarding liquid through the port 6, and accordingly also the speed of operation of the dash pot, is controlled, as shown, by a rod 7 fitting within the piston rod and having one end arranged to close more or less of the port 6. The rod 7, as shown, is threaded into the piston rod, as shown at 8, to permit adjustment thereof for varying the amount of opening of the port 6. To facilitate adjustment of the rod 7 the piston rod 3 is provided with a wing nut 10 which is fixed against rotation with respect to the piston rod in any suitable manner, as by the provision of flat surfaces between the piston rod and wing nut. The piston rod and the port rod 7 may be clamped in adjusted relation to each other by the lock nut 11.

The objectionable leakage of oil or other retarding fluid from the dash pot usually occurs at the joint between the piston rod and the casing. My invention comprises means for making the dash pot fluid tight at this point. These means, as shown, comprise a packing member 14 which is preferably formed of thin sheet material, such as steel, copper or other suitable material. The thickness of the sheet depends upon the material employed and upon the type of dash pot in which it is to be used. In a dash pot for use in an ordinary adding machine a sheet of soft brass having a thickness between eight and twelve one thousandths of an inch is suitable. The member 14 is clamped, so as to form a fluid tight joint at its outer edge between the body of the dash pot and the cap 2, the latter being threaded upon the body of the dash pot. The central portion of the member 14 is in the form of a sleeve 15, the inner portion of which is tapered towards and into engagement with the piston rod. A follower ring 16 slidable along piston rod 3 has a tapered inner surface portion 17 which engages the tapered portion of the sleeve 15 and is adapted, by reason of the pressure exerted upon the follower 16 by the spring 18, to wedge the tapered portion of the sleeve 15 tightly against the surface of the piston rod so as to form a fluid tight joint. This spring, as shown, is concentric with the piston rod and has one end in engagement with the piston and the other in engagement with a shoulder 19 formed on the follower 16. With this arrangement of the spring the pressure of the spring increases during the stroke of the piston when the pressure of the fluid at the joint between the piston rod and casing is greatest; so that the packing is forced most firmly in place when the tendency to leak is greatest.

It is to be understood that my invention is not limited to dash pots and that many modifications may be made without departing from the spirit of my invention.

Having thus described my invention, what I claim and desire to secure by Letters Patent of the United States is:—

In a device of the character described, the combination with a casing having a piston movable therein and a piston rod passing through one end thereof, of a sheet of metallic packing having its outer edge secured to said casing and having a sleeve portion fitting around said piston rod, a follower on said piston rod having a wedge action on said sleeve and a spring one end of which is in engagement with said follower and the other end of which is in engagement with said piston whereby the pressure of said follower on said sleeve is varied according to the movement of said piston.

In testimony whereof, I have signed my name to this specification.

ANDREW EKMAN.